United States Patent
McGushion

(10) Patent No.: US 7,057,137 B1
(45) Date of Patent: Jun. 6, 2006

(54) ORBITAL WELDING INTERNAL PRESSURE CONTROL

(76) Inventor: Kevin David McGushion, 1448 19th St., Santa Monica, CA (US) 90404

( * ) Notice: Subject to any disclaimer, the term of this patent is extended or adjusted under 35 U.S.C. 154(b) by 0 days.

(21) Appl. No.: 11/002,385

(22) Filed: Dec. 2, 2004

(51) Int. Cl.
*B23K 9/16* (2006.01)

(52) U.S. Cl. .............................. 219/125.11; 219/60 R; 219/74

(58) Field of Classification Search .............. 219/60 R, 219/61, 74, 125.11

See application file for complete search history.

(56) References Cited

U.S. PATENT DOCUMENTS

| 5,196,664 A | 3/1993 | McGushion |
| 5,304,776 A | 4/1994 | Buerkel |
| 5,824,983 A | 10/1998 | Huddleston |

*Primary Examiner*—Clifford C. Shaw
(74) *Attorney, Agent, or Firm*—Aaron P. McGushion

(57) ABSTRACT

The present invention is generally comprised of a tube adaptor, a chamber, a chamber pressure sensor, a calibration pressure sensor, an iris valve, an iris valve drive means, and a control and data processing means. In a calibration mode, the calibration pressure sensor measures the purge pressure at the abutment of two flow elements, while concurrently measuring the corresponding pressure at the chamber pressure sensor. In the welding mode, the calibration pressure sensor is removed, and the corresponding pressure within the chamber is maintained throughout the welding process to affect the geometry of the molten weld bead.

16 Claims, 4 Drawing Sheets

ORBITAL WELDING INTERNAL PRESSURE CONTROL

BACKGROUND

1. Field of Invention

This invention relates generally to a pressure sensing and control device, and, more particularly, to a device enabling the adjustment of purge gas flow automatically and dynamically during the orbital welding of tubular components, to maintain a desired internal tube pressure, for the purpose of affecting the internal geometry of a molten weld bead and reducing particle generation. Additionally, the present invention relates to a device enabling the adjustment of purge gas flow and pressure relative to the activity of an orbital tube welder, again for the purpose of affecting the internal geometry of a molten weld bead and reducing particle generation during the weld.

2. Description of Prior Art

When welding in abutment two metal tubes or components with tubular extensions, using an orbital welding device, such as the device disclosed in U.S. Pat. No. 5,196,664 to McGushion (1993), it is generally a desired result to create a weld bead which completely penetrates the walls of the tubular extensions at the seam formed by the abutment, has a weld bead which fully envelopes the inner diameter and outer diameter seam formed between the two tubular components, and fuses together the complete wall cross sectional areas of the tubular extensions.

Often, the result of complete penetration is an undesirable weld bead protrusion into the internal diameter of the tubular component, effectively decreasing this internal diameter at the weld location. This protrusion can trap impurities during normal operation of the manufactured product and create a significant and undesirable head loss in the system.

A method currently being used in industry to attempt the minimization of internal weld bead intrusion and, at the same time, fully penetrate the walls of the tubular components, involves the manual adjustment of the electric current supplied to the orbital welder prior to the welding process. Prior to the welding process, a welding practitioner attempts to adjust the electric current output of the orbital welding device to produce the desired weld bead, based on past experience. Depending on the configuration and heat transfer properties of the components being welded, significantly different schedules may be required. For example, the wall thickness of the tube is a significant factor in determining a weld schedule, and require quite dissimilar weld power schedules. A thin wall tube requires much less power to fully penetrate, compared to a thick walled tube.

The heat fusion process employed by orbital welders heats the outer diameter of the tube, melting the parent material. The heat travels through the wall of the tube on a convergent path to the inner diameter, with the resulting molten weld bead forming a similar path, converging to a point near the inner diameter. The resulting weld bead may not fully envelope the internal diameter weld seam, if there is even a slight misalignment of the seam versus the electrode of the orbital welder. This method can result in an unacceptable rate of weld rejection or failure.

Another method used in industry to attempt a solution to this problem involves adjusting the electric current being supplied to the orbital welding device and, simultaneously, increasing the internal purge gas pressure at the weld seam. The increased width of the weld bead, resulting from the increased electric current, insures complete penetration and full coverage of the seam between the tubular extensions, while the increase internal purge pressure supports the weld.

During the welding process, the highly viscous nature of the molten metal in combination with the increased bead width will cause the weld bead to sag down, due to the gravitational pull. To eliminate this undesirable sag, the internal volumes of the tubes are pressurized with gas to a pressure greater than the pressure of the gas surrounding the outer volume of the weld location. The positive internal pressure of the system tends to support the weld bead when in its molten phase, preventing the bead from sagging and minimizing internal weld bead intrusion.

The internal pressure increase is created by introducing a flow of inert gas into the inner volume of the components to be welded at an inlet upstream of the weld joint, and restricting the flow at an outlet downstream of the weld joint. The flow of gas can be kept constant in every stage of the welding process by employing a flow regulator, mass flow controller, fixed flow device, or a valve.

Although the concept of supporting the molten weld bead with increased internal pressure is approaching an acceptable solution, there are several major problems with the constant internal flow method. The first problem occurs if the internal pressure is too low, causing a sagging of the weld bead as previously described. The second problem occurs when the internal pressure is too high, causing the weld bead to bulge out radially, away from the center of the tubular extensions, characterized by an undesirable increase in internal and external diameters of the tubular extensions at the weld joint. If the internal pressure is even higher, the gas may cause the molten weld joint between the tubular extensions to rupture, completely destroying the weld bead and, possibly, the components being welded. A rupture is, for obvious reasons, an extremely undesirable occurrence. Any one of these problems may occur while using the constant flow positive internal pressure system.

The constant flow positive internal pressure system's inherent unpredictability is caused by the behavior of the tubes during the welding process. The orbital welding device creates an electric arc, flowing from the weld joint to an electrode attached to the welding device. The arc is generally first formed at a point which be considered, for the purpose of clarity, to be at an angle of 0 degrees. After an arc is formed, the electrode begins to rotate around the weld joint, melting the parent material of the tubes. Usually the electrode makes at least one 360 degree orbit.

As the electrode orbits around the tubular extensions, the parent metal of the component closest to the electrode melts, and quickly solidifies as the electrode rotates away. The fusion of the parent metal of the tubes, and the subsequent creation of a weld bead, causes that particular area of the seam to contract; and the remaining seam not yet fused, tends to separate, as an opposite reaction to the contraction of the welded area, forming a gap.

The temporary gap formed at this point allows the internal flow of gas to escape, causing an undesirable internal drop in pressure. When the electrode obits to the area of the seam gap, fusing this part of the seam, the internal pressure will again change, increasing to a pressure near or exceeding the pre-weld pressure. This phenomenon can degrade the quality of the weld or even rupture the weld seam, and potentially destroy the electrode.

Yet another method is used to try to compensate for the pressure drop due to the uneven tube contraction during a weld. The flow of purge gas inside the tubes is adjusted manually at the outlet restriction valve, located downstream of the components being welded, as disclosed in U.S. Pat.

No. 5,824,983 to Huddleston (1998). The operator manually adjusts the valve throughout the welding process in order to maintain a near constant internal pressure.

In alternate variations on this concept, before the weld is initiated, the pressure of the system is calibrated by installing a calibration pressure gauge at the location of the seam to be welded, between the tubes. Additionally, a control pressure gauge is placed at a point downstream of the weld seam, upstream of the manual valve. A gas flow is then introduced into this calibration configuration. The flow is increased until the desired internal pressure, the pressure required to support the molten weld bead, is observed on the calibration gauge at the seam. Because the head loss between the weld seam location and the control gauge is generally constant throughout the welding process, the control gauge provides an accurate measurement of internal pressure, compensating for any head losses of the existing system, such as head losses due to changes in fluid path direction, diameter, or roughness. The pressure reading on the control gauge is observed and recorded as a reference for the welding process.

To prepare for the actual weld, the calibration gauge is removed, and the tubes are held together in abutment by a clamping device. The orbital welding device is then attached to the components and clamping device. During the welding process, it is required that a person continuously observes the pressure reading at the control gauge and adjust the metering valve in order to maintain the pressure recorded on the control gauge in the calibration mode.

Because the internal pressure of the system can change at a rapid rate, it is difficult for a person to accurately manually adjust the flow of internal gas. This inaccurate and slow method of adjustment can easily result in a flawed weld bead and damage to expensive components. In addition to the poor quality, low reaction time, and inaccuracies inherent to the manual pressure control system, it is labor intensive, requiring the constant supervision and control by a person.

The system for welding pipes disclosed in U.S. Pat. No. 5,304,776 to Buerkel (1994) provides positive internal pipe pressure and vacuum to counteract the gravitational affect on the molten weld bead. This requires a complicated system consisting generally of a mass flow controller (MFC), a vacuum generator, and a controller, working in conjunction with a pressure sensor. A closed loop control system is formed, with the MFC and vacuum generator responding to the pressure transmitted by the pressure sensor.

This system tends to react slowly to changes in the weld bead condition, due to the time required for a change implemented by the MFC and vacuum generator to complete fluid communication with the weld seam location. Weld bead conditions can change rapidly, and require a control loop system that can address developing problematic conditions before systemic failure.

Additionally, this system makes use of arc voltage control system loop between the controller and orbital welder. Essentially, the system may not be compatible with existing orbital welders presently in use, requiring the purchase of both the pressure control system and the compatible orbital welder.

What is needed is a device that facilitates the manufacture of predictable, high quality weld beads that do not protrude excessively into the internal diameter of the tubular extensions. What is also needed is a device that automatically, quickly, and accurately adjusts for pressure changes dynamically during the welding process.

OBJECTS OF THE INVENTION

It is a general object of the present invention to provide a system for controlling the internal flow and pressure of tubular components throughout the welding process to overcome the deficiencies of existing systems and methods.

It is another object of the present invention to provide a system in which a predetermined constant internal tube pressure can be preprogrammed, and, in an automatic and timely manner, be adjusted to respond to pressure altering occurrences at the molten weld seam during the welding process, to ultimately affect the geometry of the weld bead.

It is yet another object of the present invention to provide a system in which a variable internal tube pressure schedule can be programmed.

It is a further object of the present invention to provide a relatively inexpensive means to adjust the downstream exhaust flow of purge gas in a timely manner.

It is yet a further object of the present invention to provide system that is capable of aiding in the manufacture of consistent, fully penetrated, high quality orbital weld beads.

SUMMARY OF THE INVENTION

In accordance with the present invention, a weld bead geometry control system is provided for use in welding, in abutment, tubes or tubular components. The present invention can accurately and quickly correct for changes in purge gas pressure due to flow losses in real-time, to prevent any undesired protrusion or concavity of a molten weld bead, while allowing complete penetration of the weld. The present invention can additionally adjust the internal purge pressure to counteract the effects of gravitational pull on the molten weld bead. The weld bead geometry control system can in act in concert with existing orbital welding systems to consistently produce high quality and fully penetrated weld beads that meet or exceed industry standards.

The preferred embodiment of the present invention is generally comprised of a tube adaptor, a pressure sensor chamber, a primary pressure sensor and transmitter, a calibration pressure sensor and transmitter, an iris valve, a maximum aperture limiting means, a minimum aperture limiting means, an iris valve drive means, and a control and data processing means.

The present invention can operate in three primary modes that will be discussed in further detail in the following description. In the first mode, a purge exhaust pressure is entered into the control and data processing means by the operator; and the entered pressure is maintained throughout the welding process. The first mode requires the use of only the primary pressure sensor and transmitter.

In the second mode, the calibration pressure sensor and transmitter is interposed between the components to be welded at the location of the seam, before the weld is initiated. The purge pressure desired at the weld seam is entered into the control and data processing means by the operator, and the purge is initiated. When the entered weld seam pressure is obtained, pressure at the purge exhaust is measured and compared with the pressure at the weld seam. The difference between the two pressures is the head loss between the weld seam and the exhaust. The calibration pressure sensor and transmitter is removed before the weld; and the components are placed in a welding fixture, securing the joint in a substantially leak tight manner. During the weld, the purge exhaust pressure recorded during the calibration process is maintained. This will produce the desired pressure at the weld seam, and compensate for any head losses.

In the third mode, the pressure can be automatically varied from a maximum pressure to a minimum pressure approximately equal to atmospheric pressure. The pressure variation correlates to the electrode position and weld amperage. Depending on conditions such as seam gap, gravitational forces, or other geometric or metallurgical variations, the pressure is adjusted to prevent a sagging towards the central axis of the tubular component on the top of the weld, and sagging away from the central axis of the tubular component on the bottom of the weld. The control and data processing means must be in communication with the orbital welder control means in this mode.

In all modes of operation, before the welding process is initiated, a purge gas, such as argon, is introduced into the interior of the tubular components being joined. This pre-weld purge process can take as much as several minutes to eliminate impurities and atmospheric gases. The weld bead geometry control system receives the exhausted purge gas upon exiting the tubular components. A preprogrammed internal purge gas pressure is obtained by either increasing or decreasing the iris valve orifice.

A PID loop, or other similar feedback control process, is created between the control and data processing means, the pressure sensor and transmitter, the limiting means, and the iris valve drive means. When the purge gas is introduced, the internal purge pressure is measured and transmitted by the pressure sensor and transmitter to the control and data processing means. If the pressure sensed is lower than the preprogrammed pressure, then the control and data processing means signals the iris valve drive means to decrease the iris valve aperture. The iris valve aperture can be decreased until the minimum aperture diameter is reached, defined as the point which the iris valve locator lever contacts the minimum aperture limiting means; likewise, the maximum aperture diameter is defined as the point which the iris valve locator lever contacts the maximum aperture limiting means. The control and data processing means is programmed to operate within the maximum and minimum diameters defined by the limiting means. If the pressure sensed is higher than the preprogrammed pressure, then the control and data processing means signals the iris valve drive means to increase the iris valve aperture.

If at any time during the pre-weld purge the maximum or minimum aperture limiting means are actuated, an error message is displayed on a display in the control and data processing means indicating that the pressure cannot be controlled within specifications. Several conditions can cause the purge pressure to be out of the control range, including insufficient or excessive purge flow through the system or a misalignment of the components or gaps between them. This will prevent a weld from being initiated under unacceptable circumstances. The correct purge input can be properly adjusted relative to diameter of the components being welded to match requirements set forth by industry. These flow requirements were developed to insure adequate flow of purge gas to eliminate impurities and reactive gases, to produce a zero-discoloration weld bead.

The purge pressure is stabilized quickly during the pre-weld purge of the components; and the orbital welding system and components are prepared for the welding process. After an arc is established between the components and the electrode of the orbital welder, the electrode rotates around the seam between the two components, fusing the parent material at the seam.

When the first segment of the weld bead cools and forces the opposing sector of the joint to separate, releasing a portion of the internal purge gas, the pressure will begin to decrease. This decrease is quickly detected by the pressure sensor and transmitter, and communicated to the control and data processing means. Then, the control and data processing means signals the iris valve drive means to decrease the iris valve aperture until the preprogrammed purge pressure is restored. This process of generally decreasing the aperture diameter to compensate for the loss of purge gas through the joint separation is continuously repeated until the joint separation begins to be sealed by the weld bead.

As the joint separation is decreased in area, due to weld bead coverage, the internal pressure will begin to increase. In a method similar to the pressure decrease scenario, the iris valve orifice is increased in diameter until the preprogrammed pressure is within tolerance.

Throughout the welding process, the diameter of the iris valve is automatically adjusted to maintain the desired internal purge gas pressure. The ideal internal pressure will support the molten weld bead and prevent sagging or protrusion into the internal diameter of the tubular component. Additionally, spikes in pressure, exceeding the preprogrammed pressure, which can cause the weld bead to rupture or expand, are avoided.

Additionally, it is important to maintain the required purge throughout the welding process to transport gaseous particles generated from the molten weld bead out of the components to atmosphere. If the purge rate is below the required amount, these gaseous particles can precipitate on the walls of the tubular component, forming a thin deposit of impurities. The present invention maintains the required purge rate, preventing this undesired deposit.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
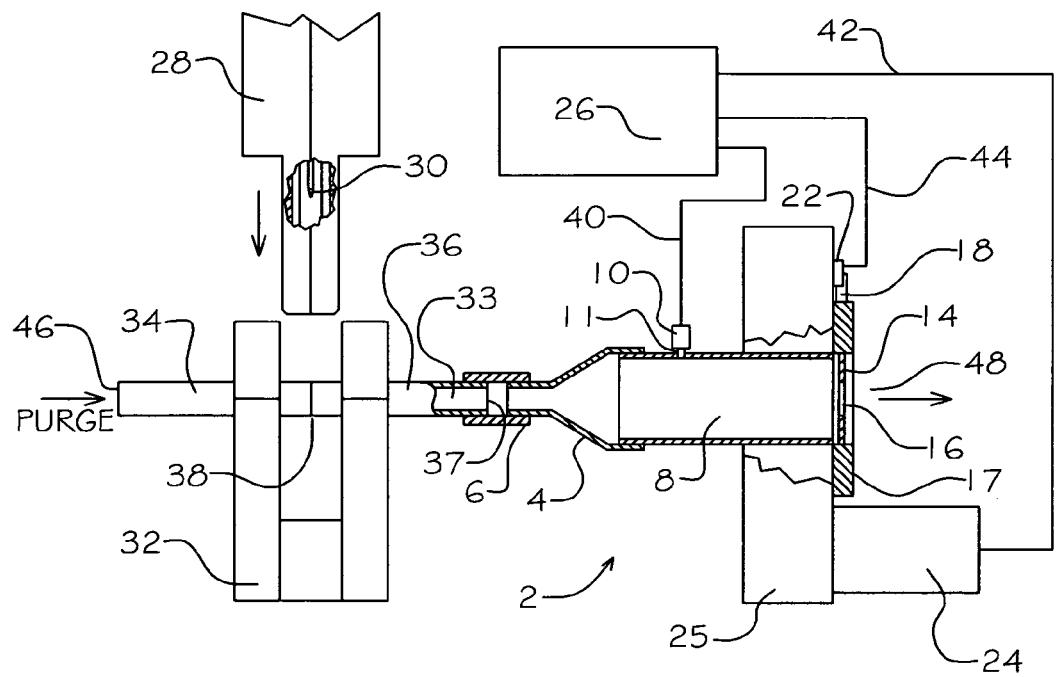
FIG. 1 is a partial section plan view of the present invention connected to an orbital welding setup, in the first mode of operation

FIG. 1 illustrates the configuration for welding tubular components utilizing the first mode of operation. When welding together two tubular components (34) and (36) with an orbital welder (28), the components are clamped securely in abutment within a welding fixture (32), with the seam (38) at the juncture of the tubular components (34), and (36) being located in line with the expected location of the electrode (30). The orbital welder (28) is inserted into the welding fixture (32), in preparation for the welding process.

The tubular components (34) and (36) that will be welded may be individual, standalone, pieces or part of a system, with a complexity that may vary from simple to intricate, as in a gas cabinet for the semiconductor industry, or a fuel system in the aerospace industry.

A purge gas is introduced at the exterior of the general area surrounding the seam (38) and the interior volume (33) of the components before the weld is initiated. A purge gas flow rate that is appropriate for the system being welded is introduced upstream of the seam (38), potentially traveling through multiple existing component assemblies. The purge gas then exits the system downstream of the seam (38).

A tube adaptor (4) is attached to the terminus (37) of the last component downstream of the seam (38), guiding the exhausted purge gas into the pressure sensor chamber (8). The tube adaptor (4) may be connected to the component terminus (37) through a coupling means (6). Because the outer tube diameter of the components can vary from approximately 0.125 inches to greater than 2 inches, the tube adaptor (4) is needed to communicate in a leak tight manner between the purge gas exhaust (48) of the tubular component (36) and the pressure sensor chamber (8).

The pressure sensor and transmitter port (11) is located through the wall (13) of the pressure sensor chamber (8). The primary pressure sensor and transmitter (10) could be any device capable of sensing the internal pressure of the pressure sensor chamber (8) and transmitting the corresponding signal to the control and data processing means (26).

At the downstream portion of the pressure sensor chamber (8) is the iris valve (14), forming a leak tight assembly between the iris valve housing (17) and the pressure sensor chamber (8). Both the pressure sensor chamber (8) and the iris valve (14) are held securely in a support structure (25). The iris valve housing (17) can be mounted to the support structure (25). The iris valve drive means (24) is mounted to the support structure (25), mechanically connected to the iris valve (14). The iris valve (14) is the preferred valve; however, the present invention is not limited to the iris valve (14). Any number of appropriate adjustable valves may be used in place of the iris valve (14). Because the iris valve orifice (16) maintains a substantially circular shape throughout the complete flow range, the behavior of the iris valve (14) can be more linear and predictable than alternate valves.

Figure 4A:
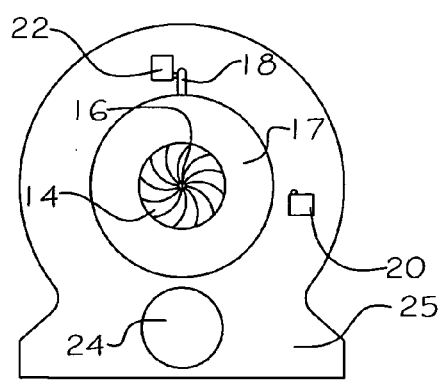
FIGS. 4A–B are plan views of the present invention.
Figure 4B:
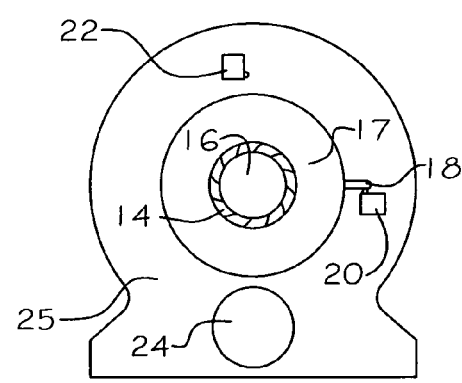

Referring to FIGS. 4 and 5, mounted to the iris valve housing (17) are generally two limit switches, which can be activated by the locator lever (18). The locator lever (18) is oriented normal to the tangent in relation to the iris valve (14) rotation, rotating with the increasing and decreasing iris valve orifice (16). The maximum aperture limit switch (20) defines the point at which the iris valve orifice (16) has expanded to the maximum diameter, and is contacted by the locator lever (18). The minimum aperture limit switch (22) defines the point at which the iris valve orifice (16) has contracted to the minimum diameter, and, again, is contacted by the locator lever (18). The upper and lower boundary limitations, defined by the limit switches, allow for the use of less expensive drive means, such as standard actuators or motors.

The desired internal tube pressure is entered into the control and data processing means (26) by the welding practitioner. A purge schedule is initiated, displacing the atmosphere in the internal volume of the tubular components (34) and (36) with the purge gas. At the beginning of the purge process, the iris valve orifice (16) is set at the maximum aperture diameter, to prevent over pressurization of the system.

The iris valve orifice (16) is then reduced in diameter; while, simultaneously, the pressure is monitored in the pressure sensor chamber (8) by the primary pressure sensor and transmitter (10). The control and data processing means (26) receives the internal pressure data through the pressure data line (40), and determines the appropriate direction of travel for the iris valve drive means (24). For example, if the pressure detected is below the target internal tube pressure, the control and data control and data processing means (26) signals the iris valve drive means (24) to decrease the diameter of the iris valve orifice (16), resulting in an increase of pressure. Likewise, the iris valve orifice (16) would be increased to lower the internal pressure sensed in the pressure sensor chamber (8). To prevent an overdamped or underdamped system, multiple pressure data points can be averaged, eliminating the effects of an improperly damped system.

The iris valve (14) is adjusted for a relatively short period until the preset pressure level is attained. Because the purge gas exhaust pressure is measured relatively close to the weld location, downstream of the seam (38), the complexity of the upstream component assembly does not significantly affect the present invention's pressure control or response time.

After the pre-weld purge cycle has been completed, the tubular components (34) and (36) are ready to be arc welded by the orbital welder (28). After an arc is formed, the powered electrode (30) begins to rotate around the seam (38), melting the parent material of the components.

As the powered electrode (30) orbits around the tubular components (34) and (36), the parent material closest to the electrode melts, and then solidifies as the electrode (30) continues in its rotation. The fusion of the parent metal of the components, and subsequent formation of a weld bead, causes that particular area of the seam (38) to contract; and the remaining seam, not yet fused, tends to separate, as an opposite reaction to the contraction of the welded area, forming a gap (50).

The temporary gap (50) formed at this point allows the internal flow of purge gas to escape, causing an undesirable internal drop in pressure. This drop in pressure is quickly detected by the primary pressure sensor and transmitter (10). Upon receiving the pressure reduction data, the control and data processing means (26) signals the iris valve drive means (24) to rotate in a direction to reduce the iris valve orifice (16) diameter until the predetermined internal purge pressure is restored. A PID loop is formed between the control and data processing means (26) and the primary pressure sensor and transmitter (10), to continuously adjust the iris valve (14) in reaction to the pressure changes due to the welding process.

When the electrode (30) obits to the area of the gap (50), fusing this part of the seam (38), the internal pressure will again change, increasing, perhaps to a pressure near or exceeding the pre-weld pressure. Again, the change in pressure is detected by the primary pressure sensor and transmitter (10) and is transmitted to the control and data processing means (26). In a likewise manner to the pressure decrease scenario, the control and data processing means (26) signals the iris valve drive means (24) to rotate in a direction to increase the iris valve orifice (16) diameter until, again, the predetermined internal purge pressure is restored. This process of adjusting the diameter of the iris valve orifice (16) in reaction to purge gas pressure changes is continued throughout the welding process, maintaining the preset pressure level, without significant variance.

Figure 2:
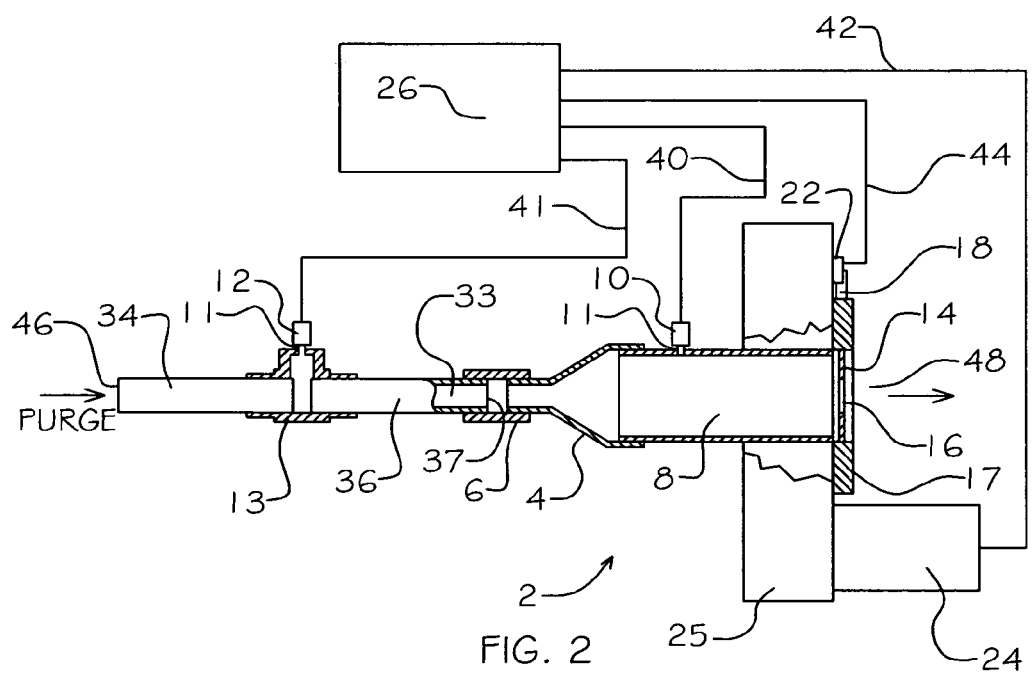
FIG. 2 is a partial section plan view of the present invention in the second (calibration) mode of operation.

As described, the first mode of operation records and reacts only to the pressure sensed in the pressure sensor chamber (8), and does not compensate for any head loss between the seam (38) and the pressure sensor chamber (8). However, in the second mode of operation, a calibration pressure sensor and transmitter (12) is interposed between the tubular components (34) and (36) at the planned seam (38), preceding the weld, as can be seen in FIG. 2. The calibration pressure sensor and transmitter (12) is mounted to a calibration tee (13), which allows for a fluid connection between the calibration pressure sensor and transmitter (12) and tubular components (34) and (36). This arrangement can more accurately control a specific pressure at the seam (38), when required.

Before the weld, the purge pressure required at the weld seam (38) is entered into the control and data processing means (26) by the weld practitioner. This seam pressure is a pressure that has been observed in past welds to produce a high quality weld bead. During the calibration process, the pressure is measured at the seam (38) by the calibration pressure sensor and transmitter (12); and the data is transmitted to the control and data processing means (26) through the calibration pressure data line (41). The iris valve (14) diameter is increased or decreased if the pressure measured at the seam (38) exceeds or is below the entered value respectively.

When the entered seam (38) pressure is attained, pressure in the pressure sensor chamber (8) is measured by the primary pressure sensor and transmitter (10) and compared with the corresponding internal pressure recorded at the seam (38) by the calibration pressure sensor and transmitter (12); and the comparative pressure in the pressure sensor chamber (8) is transmitted to and recorded by the control and data processing means (26). The difference between the two pressures is the head loss between the seam (38) and the pressure sensor chamber (8).

The calibration pressure sensor and transmitter (12) is removed before the weld process; and the components (34) and (36) are placed in the welding fixture (32). Thereafter, the calibration pressure sensor and transmitter (12) goes dormant, either by being powered down or disregarded by the control and data processing means (26). The comparative pressure recorded by the primary pressure sensor and transmitter (10) will be the set point pressure to which the pressure sensor chamber (8) will be controlled to during the welding process. As the components are being welded, if the comparative pressure is maintained at the pressure sensor chamber (8), the required pressure at the seam (38) will also be maintained.

To insure agreement between the primary pressure sensor and transmitter (10) and the calibration pressure sensor and transmitter (12), they can be directly connected in series, without significant resistance between the two. A flow is initiated between the two sensors, and the pressures compared. The data is transmitted to the control and data processing means (26). If there is agreement, then no action is taken. If there is disagreement, then the control and data processing means (26) can adjust the gain or otherwise compensate for the differences in signals.

Figure 3:
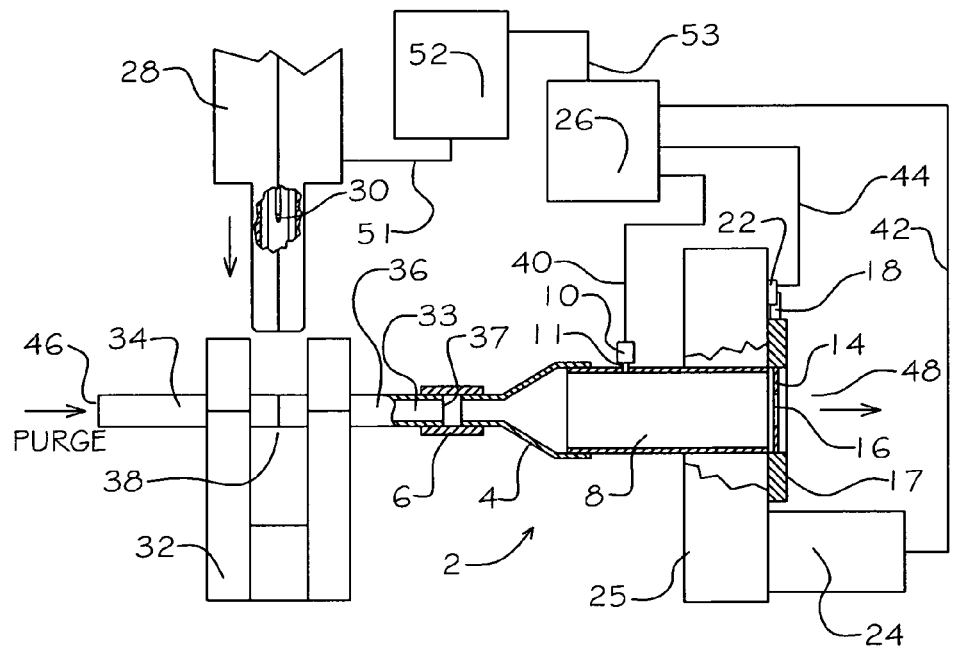
FIG. 3 is a partial section plan view of the present invention connected to an orbital welding setup, in the third mode of operation.

In the third mode, the pressure can be automatically varied from a maximum pressure to a minimum pressure approximately equal to atmospheric pressure. The pressure variation correlates to the electrode (30) orbital position. As illustrated in FIG. 3, the third mode of operation requires that the control and data processing means (26) be in communication with the orbital welder control means (52) through the orbital welder data line (53) and the orbital welder control line (51), to ascertain the position of the electrode (30), power level, and any pertinent weld information.

Depending on conditions such as seam gaps and gravitational forces, the pressure is adjusted to prevent a sagging towards the central axis of the tubular component on the top of the weld, and sagging away from the central axis of the tubular component on the bottom of the weld.

Figure 5A:
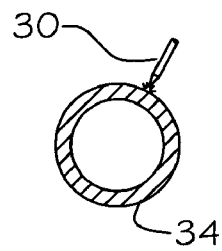
FIGS. 5A–C compare the electrode position to weld bead conditions and a possible iris valve position for each condition.
Figure 5A:
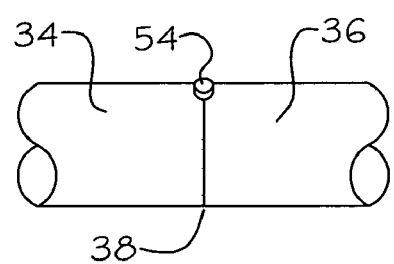
Figure 5A:
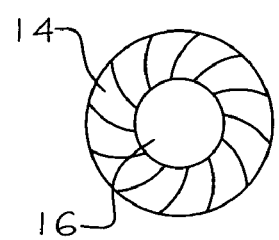
Figure 5B:
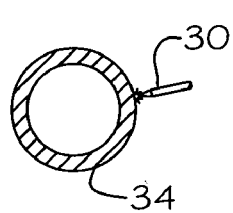
Figure 5B:
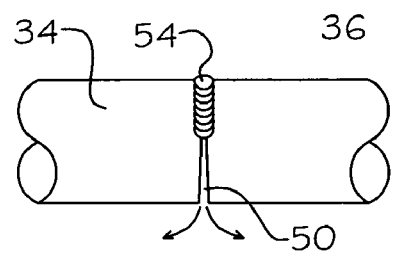
Figure 5B:
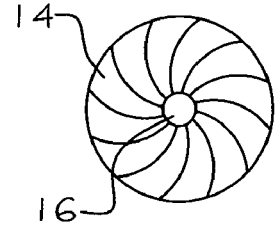
Figure 5C:
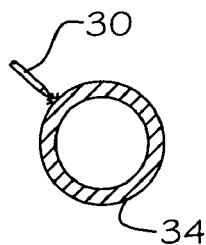
Figure 5C:
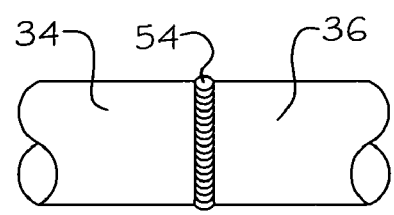
Figure 5C:
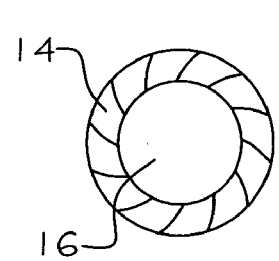

Referring to FIGS. 5A–C, the position of the electrode relative to the weld bead (54) and relative to the diameter of the iris valve orifice (16) is illustrated for all modes of operation. In FIG. 5A, when the weld is first initiated, the weld bead (54) is in the molten phase on top of the tube; and the iris valve orifice (16) is at an initial diameter. Looking at FIG. 5B, the electrode has traveled approximately 80 degrees clockwise; and the top sector of the weld bead (54) has solidified, contracting the top sector and expanding the seam (38) at the bottom, creating a gap (50). A portion of the purge gas escapes through the gap (50), decreasing the pressure. In response, the iris valve orifice (16) is decreased in diameter. Finally, in FIG. 5C, the electrode has traveled approximately 330 degrees clockwise, the resulting weld bead (54) sealing the gap (50) and eliminating the escape of purge gas. This results in an increase in the iris valve orifice (16) to compensate for an increase in pressure. Thus, the change in pressure due to weld conditions is corrected automatically throughout the weld.

Figure 6A:
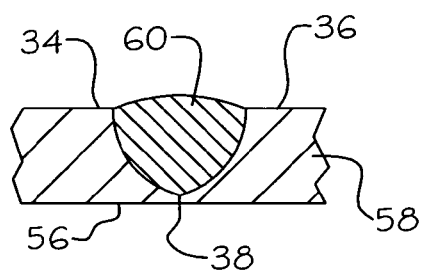
FIGS. 6A–E are cross sectional views of weld beads.

FIGS. 6A–E illustrate five possible tubular component weld bead cross sections. Referring more particularly to FIG. 6A, an under-penetrated weld bead (60) can be seen. The weld bead does not fully fuse the complete abutment joint seam (38) between the tubular components, leaving the internal diameter wall (56) unfused. This weld bead (60) is undesirable because the unfused seam (38) may entrap particles and impurities, and, additionally, weaken the bond.

Figure 6B:
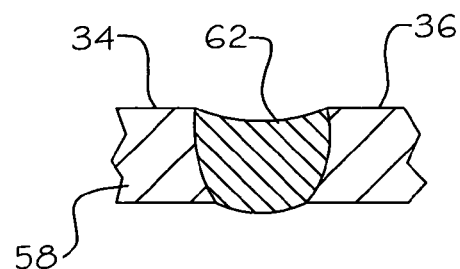

FIG. 6B illustrates an over-penetrated weld bead (62). The weld bead (62) has fully penetrated the wall (58) of the tubular components (34) and (36); however, the unsupported molted weld bead (62) was allowed to sag into the internal diameter of the tubes. This protrusion can create undesirable flow characteristics, entrap impurities and particles, and potentially cause a reduction of wall thickness near the weld site.

Figure 6C:
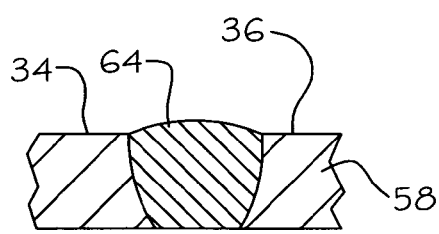

The weld bead (64) resulting from the use of the present invention can be seen more clearly in FIG. 6C. The weld bead (64) is both fully penetrated and supported while in a molten state. This weld bead (64) completely fuses the abutment joint seam (38), while preventing the sagging of the weld bead (64).

Figure 6D:
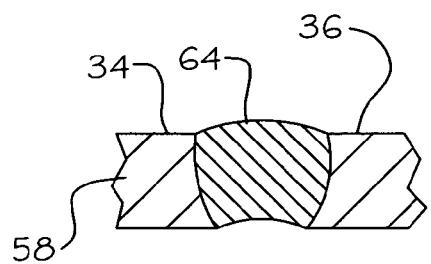

In FIG. 6D, an over-pressurized weld bead (60) can be seen. The weld bead (62) has fully penetrated the wall (58) of the tubular components (34) and (36); however, the over-pressurized molted weld bead (62) was allowed to bulge away from the internal diameter of the tubes, causing an increase in the internal tube volume at that point.

Figure 6E:
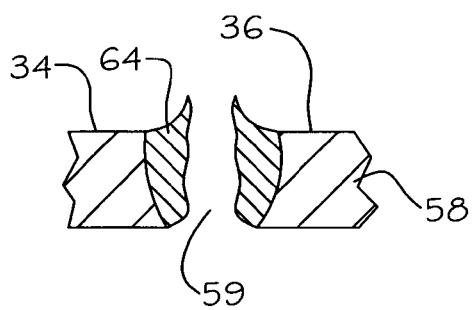

As can be seen in FIG. 6E, a rupture (59) is formed through the molten weld bead (62) as a result a result of over-pressurization beyond a critical limit. This is an extremely undesirable occurrence, as this could destroy the components as well as the electrode (30).

While the present invention has been described with regards to particular embodiments, it is recognized that additional variations of the present invention may be devised without departing from the inventive concept.

The invention claimed is:

1. A weld bead geometry control system for the orbital welding of two flow elements or flow systems held in abutment comprising:

a chamber, said chamber having an inlet, an outlet, and a pressure port, said chamber being in fluid communication with a second flow element, said second flow element being held in abutment with a first flow element forming a joint; a positive internal purge from a source flowing from said first element, through said second flow element, to said chamber;

a first pressure sensor;

a second pressure sensor; said second pressure sensor being in pressure communication with said chamber through said pressure port, said second pressure sensor sensing the pressure of said positive internal purge in said chamber;

a proportional valve, said proportional valve having an orifice having an area, said proportional valve sealantly communicating with said chamber outlet, said internal purge exiting said chamber through said orifice;

a drive means, said drive means being coupled with said proportional valve, said drive means affecting said area of said orifice, said area affecting the pressure of said positive internal purge in said chamber;

a control, data storage, and data processing means, said control, data storage, and data processing means being in data communication with said first pressure sensor and said second pressure sensor, a first and second pressure signals being received from said first and second pressure sensors, said control, data storage, and data processing means being in control communication with said drive means, a control signal being sent to said drive means respondent to said pressure signals;

wherein an internal purge pressure target at said joint is entered into said control, data storage, and data processing means, an actual internal purge pressure at said joint being sensed by said first pressure sensor prior to a welding operation, said proportional valve being adjusted to attain said internal pressure target, said a corresponding chamber pressure being sensed by said second pressure sensor, said corresponding chamber pressure being recorded by said control, data storage, and data processing means;

and wherein said first pressure sensor is deactivated concurrent to said welding operation, said first flow element and said second flow element being welded in abutment by an orbital welding means; concurrent to said welding operation, said corresponding chamber pressure being maintained in said chamber through the proportionate control of said proportional valve for the purpose of affecting the geometry of a weld bead while in the molten state.

2. The weld bead geometry control system of claim 1 wherein a maximum orifice area and a minimum orifice area are defined by a plurality of limit switches.

3. The weld bead geometry control system of claim 1 wherein a maximum orifice area and a minimum orifice area are defined by a plurality of optical switches.

4. The weld bead geometry control system of claim 1 wherein a maximum orifice area and a minimum orifice area are defined by a plurality of proximity switches.

5. The weld bead geometry control system of claim 1 wherein a maximum orifice area and a minimum orifice area are defined by a drive means load detection means.

6. The weld bead geometry control system of claim 1 wherein a tube adaptor fluidly communicates between said second flow element and said chamber inlet.

7. The weld bead geometry control system of claim 1 wherein said proportional valve is an iris valve.

8. The weld bead geometry control system of claim 1 wherein said drive means is a motor.

9. The weld bead geometry control system of claim 1 wherein said a control, data storage, and data processing means conveys information to an operator through a display means.

10. The weld bead geometry control system of claim 1 wherein said a control, data storage, and data processing means receives information from an operator through a data entry means.

11. The weld bead geometry control system of claim 1 wherein a predefined chamber pressure schedule is entered into said control, data storage, and data processing means; said predefined internal chamber pressure schedule corresponding to a molten weld sector location information received from said orbital welder control means; in a proportional control cycle said pressure measured at said chamber by said second pressure sensor being received by said control, data storage, and data processing means, compared to said predefined chamber pressure schedule, and a command signal transmitted to said purge restricting drive means to appropriately affect the area of said orifice to maintain said predefined internal volume pressure schedule, said predefined chamber pressure being at least equivalent to atmospheric pressure.

12. The predefined chamber pressure schedule of claim 11 wherein said molten weld sector location information represents a location of an electrode extending from said orbital welding means relative to said joint formed between said first flow element and said second flow element during the welding process.

13. The predefined chamber pressure schedule of claim 11 wherein said predefined internal volume pressure schedule has a maximum positive pressure at a top sector of a joint formed between said first flow element and said second flow element during the welding process, the force vector of gravity acting through said top sector and down through a central axis of said joint.

14. The predefined chamber pressure schedule of claim 11 wherein said predefined internal volume pressure schedule has a minimum positive pressure at a bottom sector of said joint formed between said first flow element and said second flow element during the welding process, the force vector of gravity acting through a central axis of said joint and down through said bottom sector.

15. A weld bead geometry control system for the orbital welding of two flow components or flow systems held in abutment comprising:

a chamber, said chamber having an inlet, an outlet, and a pressure port, said chamber being in fluid communication with a second flow element, said second flow element being held in abutment with a first flow element forming a joint; a positive internal purge from a source flowing from said first element, through said second flow element, to said chamber;

a first pressure sensor;

a second pressure sensor; said second pressure sensor being in pressure communication with said chamber through said pressure port, said second pressure sensor sensing the pressure of said positive internal purge in said chamber;

an iris valve, said iris valve having an continuously variable orifice having an area, said iris valve sealantly communicating with said chamber outlet, said internal purge exiting said chamber through said continuously variable orifice;

a motor, said motor being coupled with said iris valve, said motor affecting said area of said continuously variable orifice, said area affecting the pressure of said positive internal purge in said chamber;

a control, data storage, and data processing means, said control, data storage, and data processing means being in data communication with said first pressure sensor and said second pressure sensor, a first and second pressure signals being received from said first and second pressure sensors, said control, data storage, and data processing means being in control communication with said motor, a control signal being sent to said motor respondent to said pressure signals;

wherein an internal purge pressure target at said joint is entered into said control, data storage, and data processing means, an actual internal purge pressure at said joint being sensed by said first pressure sensor prior to a welding operation, said iris valve being adjusted to attain said internal pressure target, said a corresponding chamber pressure being sensed by said second pressure sensor, said corresponding chamber pressure being recorded by said control, data storage, and data processing means;

and wherein said first pressure sensor is deactivated concurrent to said welding operation, said first flow element and said second flow element being welded in abutment by an orbital welding means; concurrent to said welding operation, said corresponding chamber pressure being maintained in said chamber through the proportionate control of said iris valve for the purpose of affecting the geometry of a weld bead while in the molten state.

16. A method for utilizing claimed weld bead geometry control system for the orbital welding of two flow elements or flow systems held in abutment comprising steps of:

a) interposing a first pressure sensor between a first flow element and a second flow element at an abutment;

b) attaching said second flow element to a chamber, said chamber having a second pressure sensor and a proportional valving means at a terminus;

c) introducing a positive pressure internal purge to said first flow element, said positive pressure internal purge flowing through said first flow element, thereafter said first pressure sensor, thereafter said second flow element, thereafter said chamber, exiting said chamber through said proportional valving means;

d) varying said proportional valving means to affect the pressure of said positive pressure internal purge to achieve a target pressure at said first pressure sensor;

e) measuring and recording chamber pressure at said second pressure sensor in concurrence with stable obtainment of target pressure;

f) correlating the value of said target pressure to the value of said chamber pressure, said chamber pressure being set as a modified target pressure;

g) removing said first pressure sensor from said abutment, said first and second flow elements being held in abutment in a fixture means;

h) welding said first flow element to said second flow element while concurrently maintaining said modified target pressure.

* * * * *